United States Patent
Nakamura (10) Patent No.: US 9,430,137 B2
(45) Date of Patent: Aug. 30, 2016

(54) TOUCH PANEL DEVICE AND DISPLAY METHOD INCLUDING DYNAMICALLY ADJUSTING A MAGNIFICATION RATIO

(71) Applicant: FUJIFILM Corporation, Tokyo (JP)

(72) Inventor: Tatsuya Nakamura, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 336 days.

(21) Appl. No.: 14/036,094

(22) Filed: Sep. 25, 2013

(65) Prior Publication Data

US 2014/0022216 A1 Jan. 23, 2014

Related U.S. Application Data (63) Continuation of application No. PCT/JP2012/055790, filed on Mar. 7, 2012.

(30) Foreign Application Priority Data

Mar. 28, 2011 (JP) ................................ 2011-070874

(51) Int. Cl.
*G06F 3/0488* (2013.01)
*G06F 3/023* (2006.01)
*G06F 3/0481* (2013.01)

(52) U.S. Cl.
CPC .......... *G06F 3/0488* (2013.01); *G06F 3/0233* (2013.01); *G06F 3/04812* (2013.01); *G06F 3/04886* (2013.01); *G06F 2203/04101* (2013.01); *G06F 2203/04806* (2013.01)

(58) Field of Classification Search
CPC .................. G06F 2203/04101; G06F 3/0233; G06F 3/0488
See application file for complete search history.

(56) References Cited

U.S. PATENT DOCUMENTS

| | | | | |
|---|---|---|---|---|
| 8,237,666 B2* | 8/2012 | Soo | ....................... | G06F 3/0416 345/173 |
| 2010/0277414 A1* | 11/2010 | Tartz | ..................... | G06F 1/1624 345/169 |
| 2011/0157040 A1* | 6/2011 | Kashio | .................. | G06F 3/0428 345/173 |
| 2011/0175832 A1* | 7/2011 | Miyazawa | .............. | G06F 3/041 345/173 |
| 2012/0154331 A1* | 6/2012 | Hasui | .................... | G06F 3/0416 345/174 |

FOREIGN PATENT DOCUMENTS

| | | |
|---|---|---|
| JP | 08-87380 A | 4/1996 |
| WO | WO 2006/003586 A2 | 1/2006 |
| WO | WO 2008/030976 A2 | 3/2008 |

OTHER PUBLICATIONS

Chinese Office Action dated Dec. 1, 2015 with an English translation.
Extended European Search Report dated Jan. 12, 2015.
International Search Report (ISR) (PCT/ISA/237, PCT/ISA/210), in PCT/JP2012/055790 filed Mar. 7, 2012.

* cited by examiner

*Primary Examiner* — Quan-Zhen Wang
*Assistant Examiner* — Xuemei Zheng
(74) *Attorney, Agent, or Firm* — McGinn IP Law Group PLLC (57) ABSTRACT

In a multi-functional mobile phone (smartphone), a touch panel is operated to input characters or the like. When an index finger of a user approaches an image key within a predetermined distance, an on-screen keyboard is enlarged with the image key as the center of enlargement such that the size of the image key becomes larger than a contact surface size of the index finger. Touch operation is performed on an enlarged on-screen keyboard displayed.

9 Claims, 6 Drawing Sheets

TOUCH PANEL DEVICE AND DISPLAY METHOD INCLUDING DYNAMICALLY ADJUSTING A MAGNIFICATION RATIO

BACKGROUND OF THE INVENTION

1. Field of the invention

The present invention relates to a touch panel device used in a multi-functional mobile phone or the like and a display method for the touch panel device.

2. Description Related to the Prior Art

Recently, a touch panel device with a touch panel type liquid crystal display or a touch panel type organic EL display has been commonly used as a display device of a multi-functional mobile phone (smartphone). Such touch panel device does not comprise a mechanical keyboard. Instead, an on-screen keyboard composed of button images is displayed on a screen of the touch panel device when text such as an email is inputted. A user touches or taps the displayed button image with a finger to input a character or the like.

When the on-screen keyboard is displayed on the screen of the touch panel device disclosed in WO2008030976 (corresponding to Japanese Unexamined Patent Application Publication (Translation of PCT Application) No. 2010-503127), the size of each button image is smaller than the size (contact surface size) of a finger touching the on-screen keyboard. The finger used for touch operation covers the button image so that it is difficult to see which button image the finger is actually touching. The button image being touched is displayed larger than the rest of the button images when the user's finger touches the button image. This allows the user to check the button image actually touched.

In the touch panel device disclosed in the WO2008030976, the button image is displayed in the large size after the user's finger touches the button image. The user is allowed to check which button image has been touched, however, error operation such as touching a wrong button image cannot be prevented.

SUMMARY OF THE INVENTION

An object of the present invention is to provide a touch panel device capable of preventing error operation and a display method for the touch panel device.

To achieve the above and other objects, a touch panel device of the present invention comprises a touch panel, an input section, an input medium size estimator, a magnification ratio determiner, a display controller, and an accepting section for accepting command input. The touch panel has an input field and detection cells. The input field accepts input operation of an input medium, for example, a finger. The each detection cell detects an approach value indicating a degree of proximity and contact with the input medium to the input field. The input section has input elements displayed in the input field of the touch panel. The input medium size estimator estimates a contact surface size and an expected contact position of the input medium based on the detection cell outputting a first approach value within a range between a first threshold value and a second threshold value. The second threshold value is smaller than the first threshold value. The magnification ratio determiner calculates a basic magnification ratio based on the contact surface size of the input medium and size of the input element and adjusts the basic magnification ratio at a ratio within a predetermined range to determine a current magnification ratio of the input element. The display controller enlarges and displays the input section at a magnification ratio with the input element, closest to the expected contact position, at a center. The display controller uses the same magnification ratio as a magnification ratio of last enlarged display, instead of the current magnification ratio, within predetermined elapsed time from the last enlarged display. The accepting section accepts command input corresponding to the input element closest to the detection cell outputting a second approach value when at least one of the detection cells outputs the second approach value greater than the first threshold value.

It is preferable that the magnification ratio determiner determines the magnification ratio such that size of an enlarged input element becomes larger than the contact surface size when the size of the input element is smaller than the contact surface size of the input medium.

A display method for a touch panel device of the present invention comprises an approach value detecting step, an input medium size estimating step, a magnification ratio determining step, an enlargement display step, and a command input accepting step. The touch panel has an input field and detection cells. The input field accepts input operation of an input medium. The each detection cell detects an approach value indicating degree of proximity and contact with the input medium to the input field. In the approach value detecting step, the each detection cell detects the approach value corresponding to a degree of proximity and contact with the input medium to the input field in a state that the input section having input elements is displayed in the input field of the touch panel. When the input medium approaches the input field, the approach value of the detection cell approaching the input medium increases. In the input medium size estimating step, the a contact surface size and an expected contact position of the input medium are estimated based on a detection cell outputting a first approach value within a range between a first threshold value and a second threshold value. The second threshold value is smaller than the first threshold value. In the magnification ratio determining step, a basic magnification ratio of the input element is calculated based on the contact surface size of the input medium and size of the input element and then the basic magnification ratio is adjusted at a ratio within a predetermined range to determine a current magnification ratio of the input element. In the enlarged display step, the input section is enlarged and displayed at a magnification ratio with the input element, closest to the expected contact position, at a center. The input section is enlarged and displayed using the same magnification ratio as a magnification ratio of last enlargement display, instead of the current magnification ratio, within predetermined elapsed time from the last enlarged display. In the command input accepting step, command input corresponding to the input element closest to the detection cell outputting a second approach value is accepted when the input medium further approaches the input field and at least one of the detection cells outputs the second approach value greater than the first threshold value.

According to the present invention, the input section is enlarged and displayed with the input element, closest to the input medium, at the center such that the size of the input element becomes larger than the size of the input medium before the input medium actually comes in contact with the input field. This facilitates choosing a desired input element. Thereby operating a wrong input element is prevented. The magnification ratio is adjusted at a ratio within a predetermined range and is not changed frequently in a short time during use. Hence, command input operation is performed stably.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
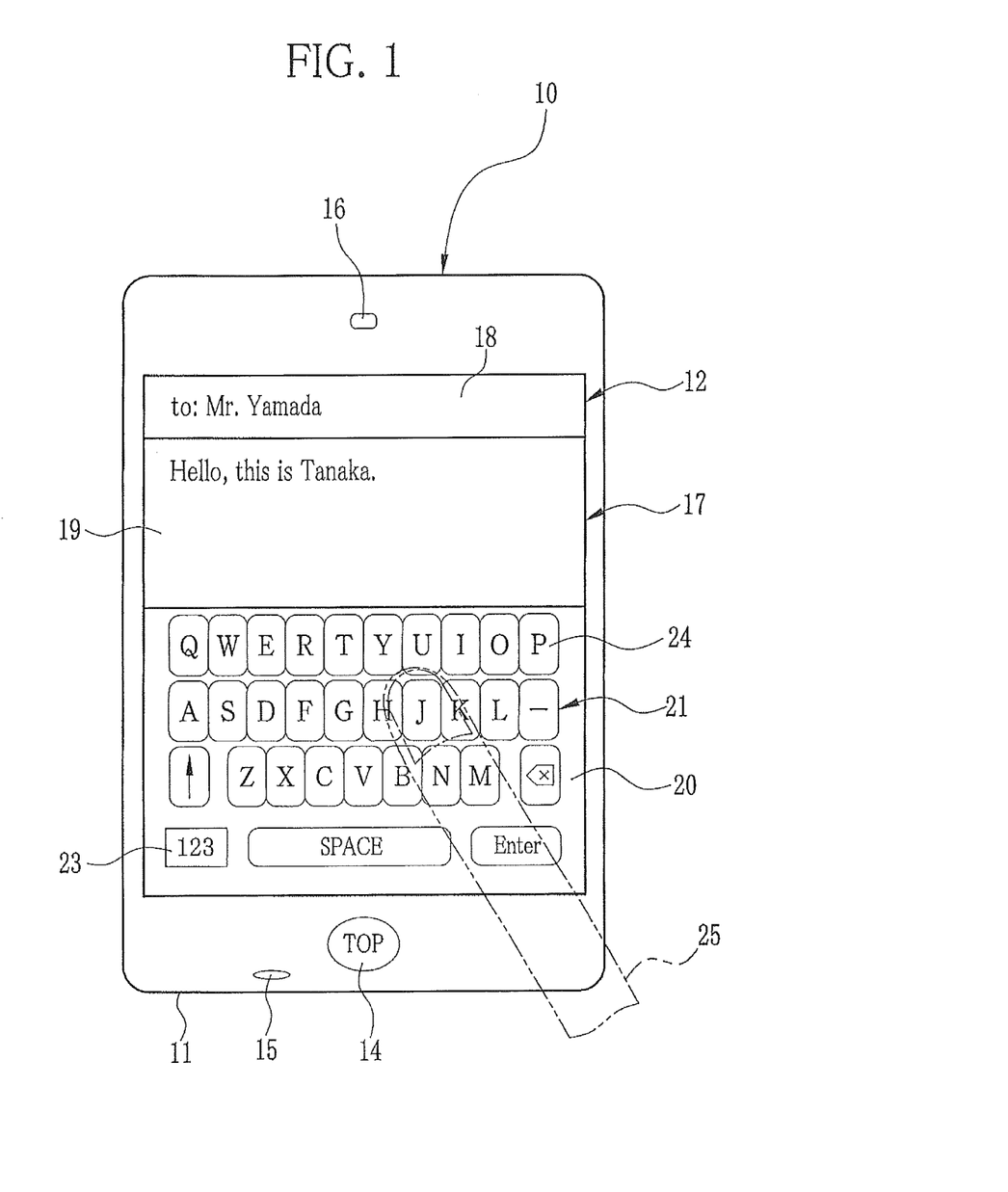
FIG. 1 is a plan view illustrating an on-screen keyboard displayed in a default size in a multi-functional mobile phone (smartphone) according to an embodiment of the present invention.

In FIG. 1, a large touch panel 12 is attached to a surface of a body 11 of a mobile phone or smartphone 10. The touch panel 12 occupies most of the surface of the body 11. A top button 14 and a microphone 15 for telephone use are provided at respective positions below the touch panel 12. The top button 14 is used to return any display state to an initial display screen (not shown), on which icons of various applications are displayed. A speaker 16 for telephone use is provided above the touch panel 12.

The touch panel 12 of the mobile phone 10 is operated to input characters, for example. When a user's finger comes close within a predetermined distance from an image key (input element) displayed on an input field of the touch panel 12, the entire on-screen keyboard (input section) is enlarged with the image key at the center of enlargement. The on-screen keyboard is displayed such that the size of the image key becomes larger than the size (contact surface size) of the finger touching a surface of the touch panel 12 in a normal manner. Thereby, the desired image key is chosen surely and easily on the enlarged and legible on-screen keyboard. An error operation such as touching a wrong image key covered by the user's finger is prevented.

When a mail creation screen 17 is displayed on the touch panel 12, an address input field 18, a text input field 19, and an input field 20 are displayed in this order in the mail creation screen 17 from the top. An on-screen keyboard 21 of, for example, a QWERTY arrangement is displayed in the input field 20. In an initial display, the on-screen keyboard 21 is in Roman character input mode. The input mode is switched to another mode such as English input mode when the finger touches a mode switch button 22. A number key switch button 23 is provided on a lower left side of the input field 20. When the finger touches the number key switch button 23, the on-screen keyboard 21 is switched to on-screen number keys (not shown).

Immediately after the mail creation screen 17 is displayed, the size of each image key 24 constituting the on-screen keyboard 21 is significantly small compared to the size of an index finger 25 of the user so as to display the entire keyboard. The index finger 25 is illustrated in imaginary lines. In an example in the drawing, a tip portion of the index finger 25 covers approximately two image keys 24.

The touch panel 12 detects an approach value indicating a degree of proximity to a finger including the contact with the finger. Thereby the touch panel 12 detects a position of the approaching finger and a position on the touch panel 12 touched by the finger. In accordance with the position of the finger detected by the touch panel 12, each process corresponding to an image (for example, an image key) displayed at the position of the finger is executed. On the mail creation screen 17, the address input field 18 or the text input field 19 is chosen by touching it with the finger. Then the finger touches one of the image keys 24. Thereby a character corresponding to the image key 24 is inputted to the address input field 18 or the text input field 19.

There are the touch panels 12 of various systems (resistive layer system, infrared system, and the like). In this embodiment, a projection type capacitive system is employed. In a touch panel of the capacitive system, the finger is electrostatically coupled with the touch panel when the finger tip approaches (or touches) the touch panel. This changes a capacitance between the finger and the touch panel. The touch panel of the capacitive system detects the change in the capacitance and thereby detects the degree of proximity of the finger to the touch panel and a state of contact between the touch panel and the finger.

The projection type refers to the touch panel 12 in which a field for detecting the touch (or approach) of the finger or the like is partitioned into a grid pattern at a sufficiently small pitch relative to the size of the finger, for example, to simultaneously detect changes in capacitance at two or more points on the touch panel 12. The change in capacitance is detected separately in each detection partition. As disclosed in the U.S. Pat. No. 7,663,607 or the like, an electrode pattern is formed in the detection partition such that the detection partition functions as a sensor. Note that the detection partition is referred to as the detection cell.

Figure 2:
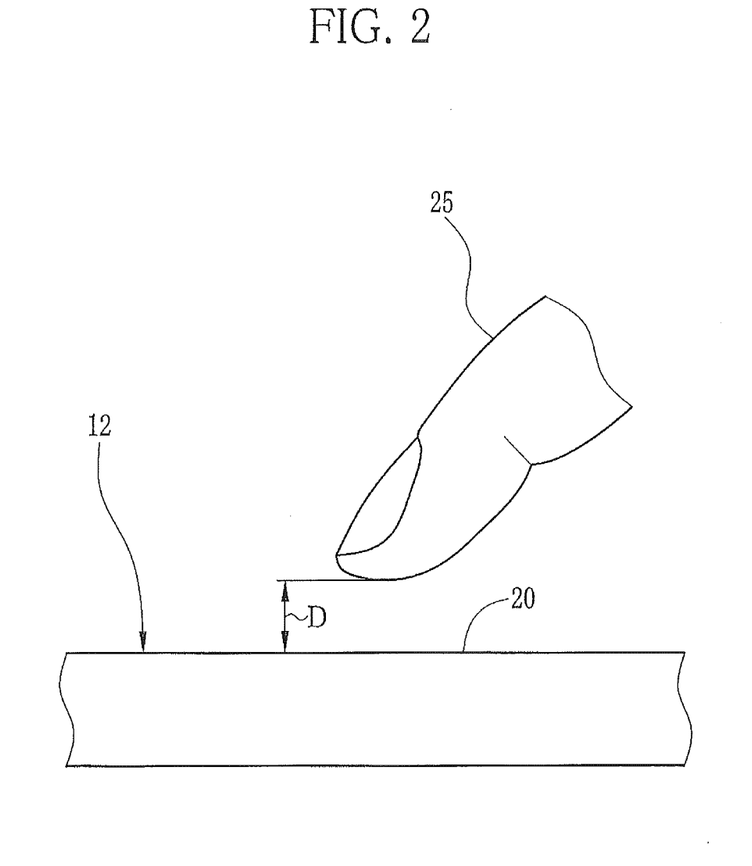
FIG. 2 is an explanatory view illustrating an index finger approaching a touch panel at a distance D.

Each detection cell outputs a voltage value (corresponding to the approach value) in accordance with an approach distance (amount of capacitance detected) of the user's finger. To be more specific, a voltage value outputted increases as the user's finger approaches the touch panel 12. For example, as shown in FIG. 2, a voltage value of a second threshold value is outputted when the finger approaches the input field 20 at a distance D (the distance between the finger and a detection field is in the order of 2 to 3 mm). The voltage of the detection cell increases toward a first threshold value as the finger further approaches the touch panel 12. When the finger comes in contact with the touch panel 12, a voltage value exceeding the first threshold value is outputted. In the case of non-contact input, note that the voltage value exceeding the first threshold value may be outputted just before the finger comes in contact with the touch panel 12.

The voltage value outputted decreases as the finger moves away from the touch panel 12. For example, when a distance between the finger and the detection cell is greater than or equal to 20 mm, the change in the capacitance cannot be detected. A voltage value "0" is outputted from the detection cell.

Figure 3:
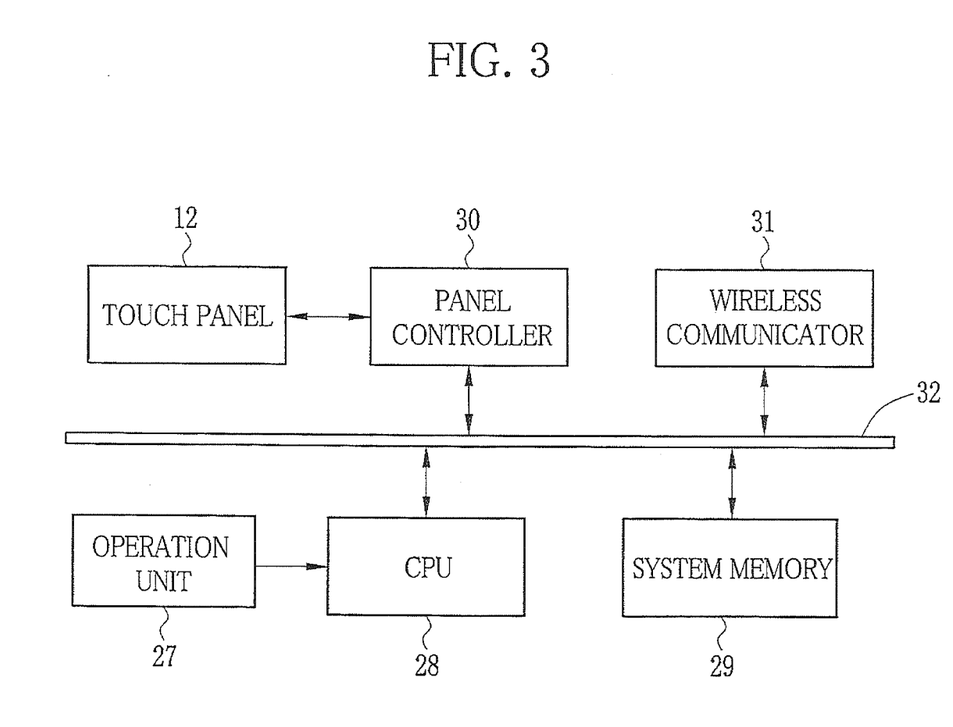
FIG. 3 is a block diagram illustrating an electric configuration of the multi-functional mobile phone.

In FIG. 3, the mobile phone 10 comprises an operation unit 27, a CPU 28, a system memory 29, a panel controller 30 (accepting section), and a wireless communicator 31 in addition to the touch panel 12. These sections are connected to each other through a bus 32. The system memory 29 is provided with a ROM area and a RAM area. The ROM area stores various programs and data for controlling the mobile phone 10. The RAM area temporarily stores various types of data generated during the control. The CPU 28 reads the various programs from the system memory 29 and runs the programs sequentially to control each section of the entire mobile phone 10.

Based on an exclusive program stored in the system memory 29, the CPU 28 functions as an input medium size estimator, a magnification ratio determiner, and a display controller, with the use of the voltage outputted from each detection cell in accordance with the approach of the finger or the like. The input medium size estimator estimates the size of a contact surface size and an expected contact position (estimated contact position). The magnification ratio determiner determines a magnification ratio of the on-screen keyboard 21 to be displayed when the finger approaches. The display controller enlarges and displays a part of the on-screen keyboard 21 at the determined magnification ratio, with the image key 24, closest to the expected contact position, at the center.

The operation unit 27 is connected to the CPU 28. The operation unit 27 is composed of mechanical operation input sections such as a push switch. The operation unit 27 includes the top button 14, a power button, and a mute button (not shown). The operation unit 27 detects an operation command from the user and inputs a result of the detection to the CPU 28. Thereby the operation command from the user is inputted to the CPU 28 through the operation unit 27.

The panel controller 30 reads various pieces of image data from the system memory 29 in accordance with a control signal from the CPU 28. The panel controller 30 converts the image data into an analog composite signal and outputs the analog composite signal to the touch panel 12. The CPU 28 sends the control signal to the panel controller 30 in accordance with the command, inputted by the user through the touch panel 12 and the operation unit 27, allowing the touch panel 12 to display various screens. The wireless communicator 31 communicates with a base station wirelessly. The wireless communicator 31 communicates various types of data with the base station to connect the mobile phone 10 to the Internet.

Figure 4:
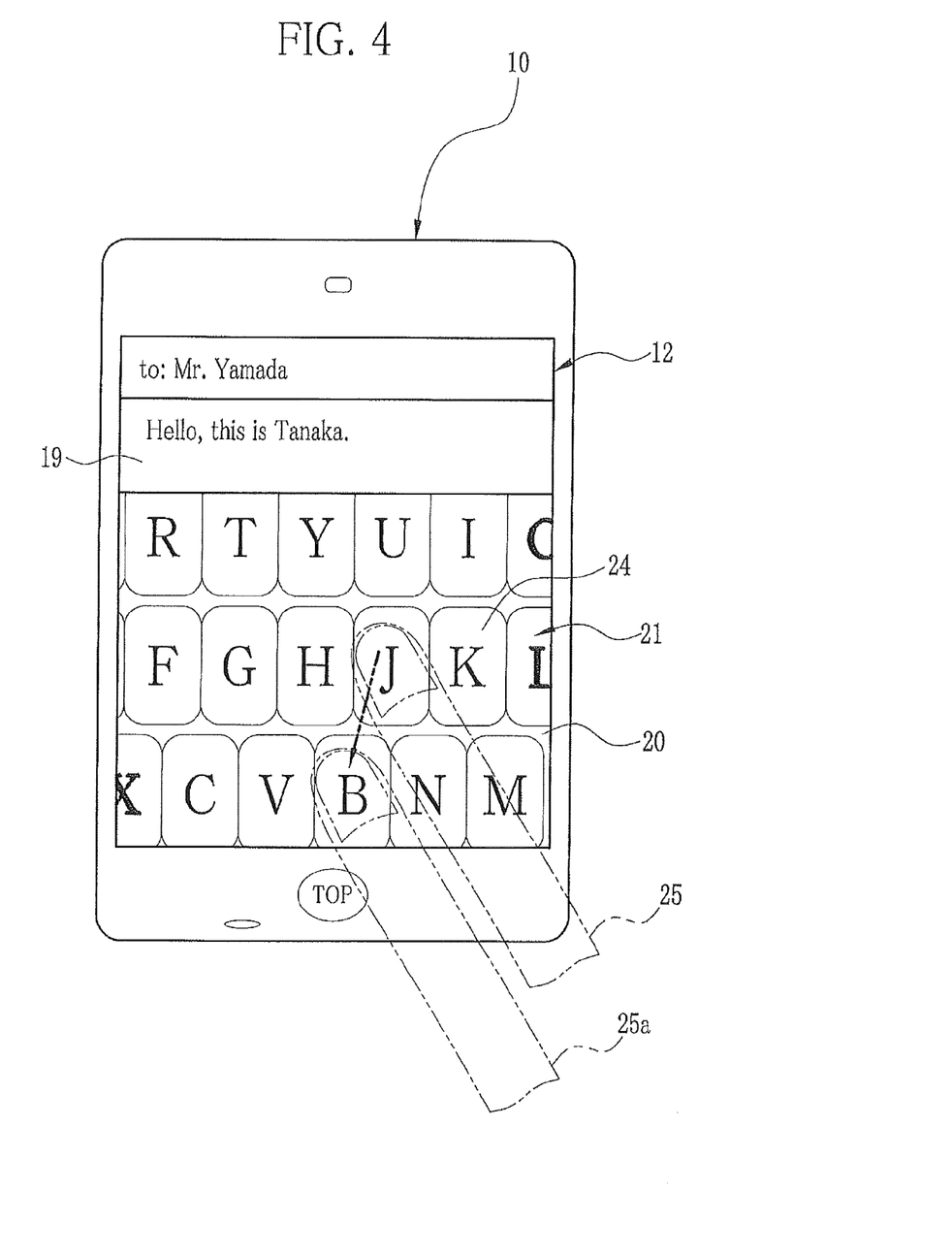
FIG. 4 is a plan view illustrating an image key enlarged to a size larger than that of a user's index finger.

In FIG. 1, the on-screen keyboard 21 on which input operation through the touch panel 12 has not been performed is displayed byway of example. The on-screen keyboard 21 is displayed in the default size on the touch panel 12. As shown in FIG. 4, when the user's index finger 25 approaches the input field 20 of the touch panel 12 within the distance D, the on-screen keyboard 21 is enlarged and displayed with the image key 24, to which the index finger 25 comes closest first out of the on-screen keyboard 21, at the center. The magnification ratio is determined such that the size of the image key 24 becomes, for example, 120% of the contact surface size of the index finger 25.

When the index finger 25 approaches the touch panel 12, the detection cell close to the index finger 25 outputs a first approach value that is within a range between the second threshold value and the first threshold value. The number of the detection cell(s) outputting the first approach value depends on the size of the index finger 25. The contact surface size (the size of the finger) is obtained by detecting the number of the detection cells outputting the first approach values. The expected contact position of the finger on the touch panel is estimated from the position of the detection cell outputting the first approach value. The on-screen keyboard 21 is enlarged and displayed at the determined magnification ratio with the image key, in the expected contact position, at the center. At the same time, the text input field 19 is narrowed and the input field 20 extends off to the text input field 19 side.

The on-screen keyboard 21 is enlarged with the image key, in the expected contact position, at the center of enlargement. The image key displayed over the detection cell with the highest approach value is determined to be the center of the enlargement. Alternatively, the image key over the detection cell located at the center of the expected contact position may be chosen as the center of the enlargement.

Once the on-screen keyboard 21 is enlarged and displayed, the display state of the on-screen keyboard 21 does not change unless the index finger 25 is moved away from the input field 20 by a distance greater than or equal to the distance D. Meanwhile, the index finger 25 may be moved onto another image key 24 as shown by a numeral 25a, for example. Note that the on-screen keyboard 21 returns to the default size when the index finger 25 is moved away from the input field 20 by the distance greater than or equal to the distance D above the input field 20 or when the index finger 25 is located outside of the input field 20.

Figure 5:
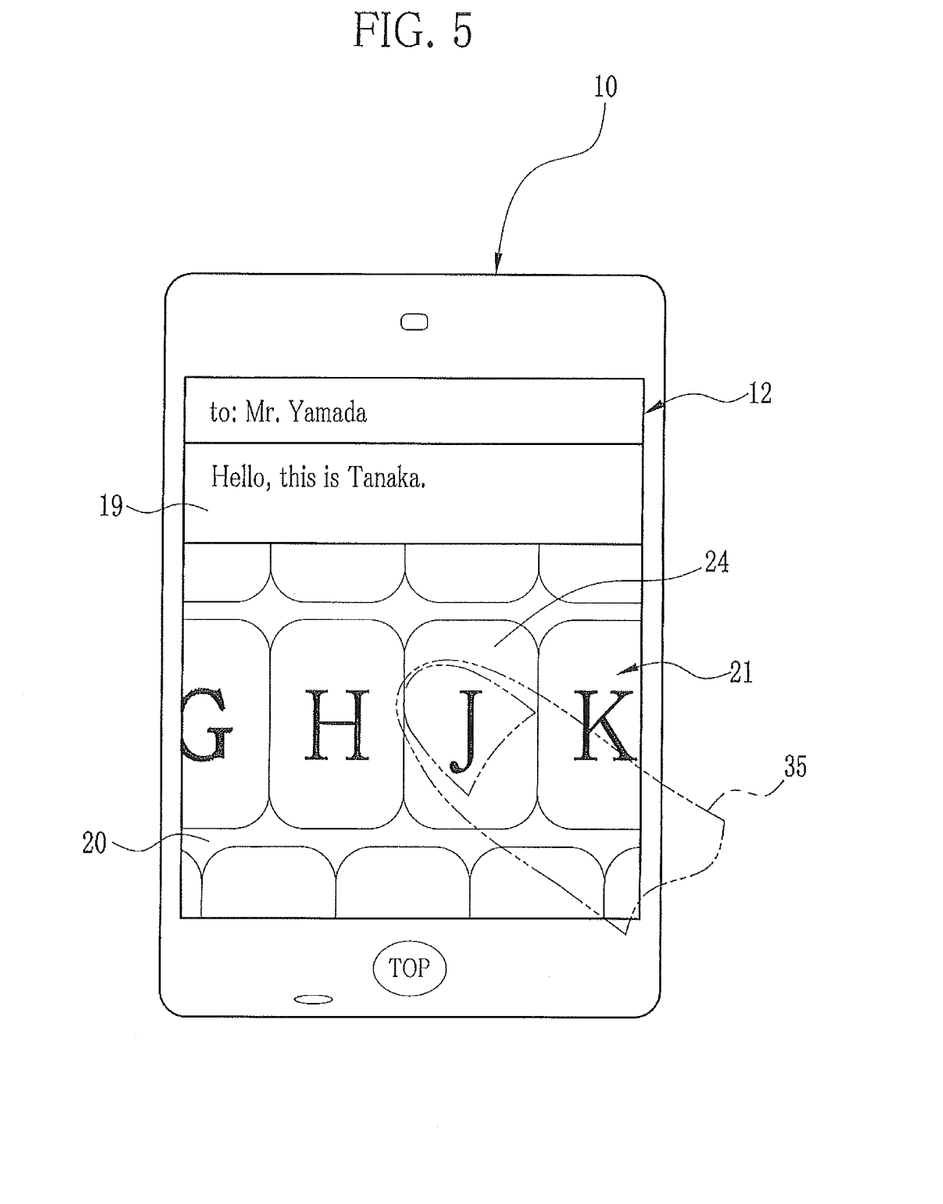
FIG. 5 is a plan view illustrating the image key enlarged to a size larger than that of a user's thumb.

As shown in FIG. 5, when the user puts his/her thumb 35, instead of the index finger 25, close to the input field 20 of the touch panel 12, the on-screen keyboard 21 is enlarged and displayed such that the size of the image key 24 becomes, for example, 120% of the contact surface size of the thumb 35. The contact surface size of the thumb 35 is larger than that of the index finger 25. The on-screen keyboard 21, more specifically, the image key 24 close to the thumb 35 is more enlarged than that close to the index finger 25. Thereby, a wrong input operation by the thumb 35 is prevented.

Note that, for example, when a little finger with its tip smaller than that of the index finger 25 is used, the on-screen keyboard 21 is enlarged and displayed such that the size of the image key 24 becomes, for example, 120% of a contact surface size of the little finger in a similar manner (not shown) . Naturally, the size of the on-screen keyboard 21 displayed is smaller than that of the on-screen keyboard 21 illustrated in FIG. 4.

Figure 6:
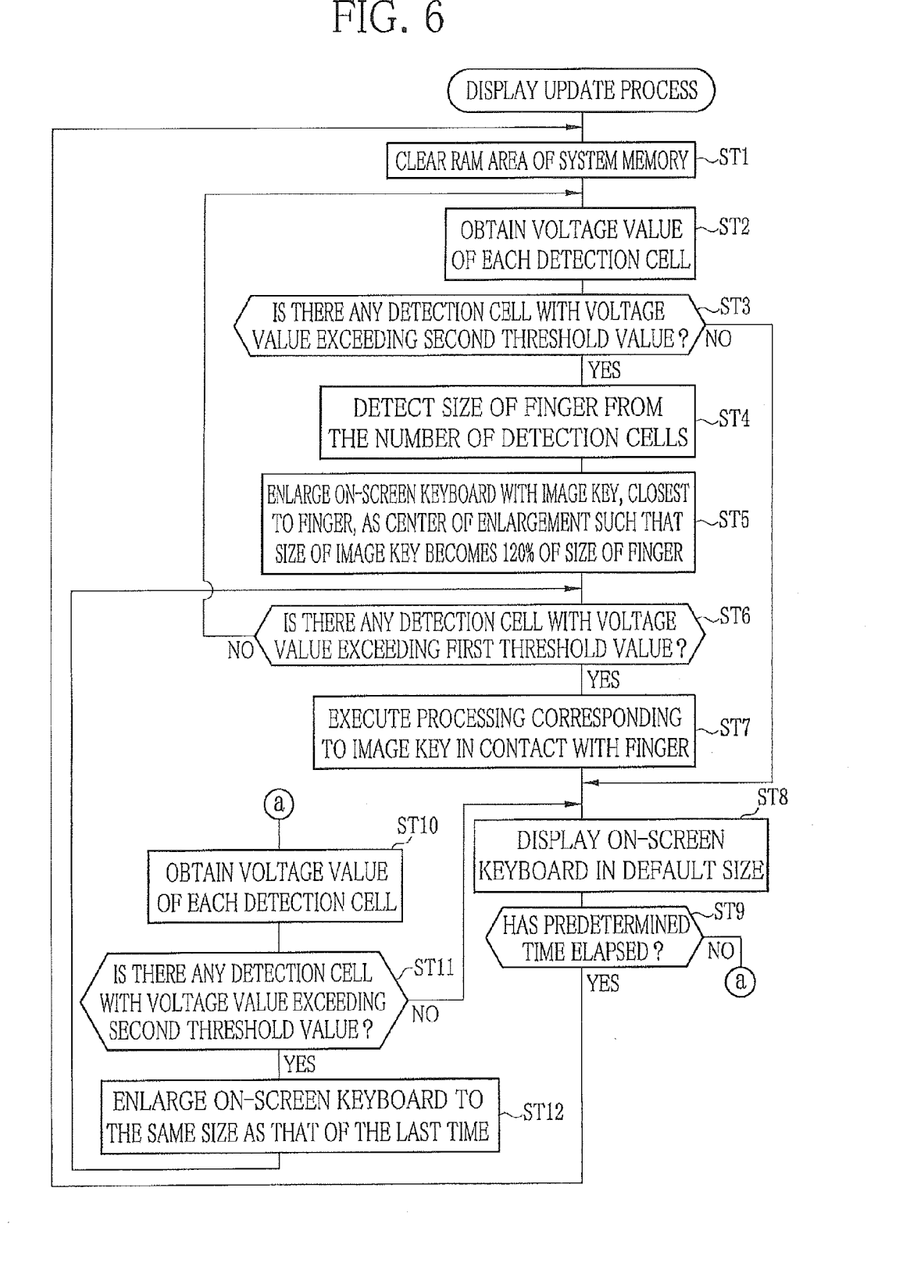
FIG. 6 is flowchart illustrating a main sequence of a display update process in the multi-functional mobile phone.

Referring to a flowchart in FIG. 6, a display update process (display method) is described. The display update process is executed by the CPU 28 of the mobile phone 10 configured as above. In FIG. 6, "ST" denotes step. The display update process is to enlarge and display the on-screen keyboard 21 when the user's finger approaches the image key 24, namely, before the user's finger comes in contact with the image key 24 to perform the input operation through the touch panel 12. The display update process is repeated after main power of the mobile phone 10 is turned on until the main power is shut down.

In the display update process, first, the RAM area of the system memory 29 is cleared (ST1). Next, an output voltage value is obtained from each detection cell provided in the input field 20 of the touch panel 12 (ST2).

Then it is determined whether there is any detection cell with a voltage value exceeding the second threshold value (ST3). If there is the detection cell (s) with the voltage value exceeding the second threshold value (YES in the ST3) , the contact surface size (the size of the finger) of the user's finger approaching within the distance D is estimated from the number of the detection cell(s) (ST4). The expected contact position is estimated from the position of the detection cell(s).

On the other hand, if there is no detection cell with the voltage value exceeding the second threshold value (NO in the ST3), the user's finger is not close to the touch panel 12. In this case, skip the processes of the ST4 to ST7 and move onto the step ST8.

Next, the magnification ratio of the on-screen keyboard 21 is determined to be 120% of the contact surface size of the finger. The image key 24 closest to the finger is identified based on the expected contact position . The on-screen keyboard 21 is enlarged and displayed at the determined magnification ratio with the identified image key 24 at the center (ST5). At this time, the input field 20 is enlarged in accordance with the magnification ratio of the on-screen keyboard 21 such that the input field 20 extends off to the text input field 19 side.

Then it is determined whether there is any detection cell with the voltage value exceeding the first threshold value (ST6). When there is no detection cell with the voltage value exceeding the first threshold value (NO in the ST6) , the enlarged on-screen keyboard 21 is displayed but the user's finger has not come in contact with the image key 24 yet. In this case, the processes of the ST2 to ST6 are repeated with the enlarged on-screen keyboard 21 displayed. While the enlarged on-screen keyboard 21 is displayed, the finger may be moved over the on-screen keyboard 21 as necessary to choose the desired image key 24.

When there is a detection cell with the voltage value exceeding the first threshold value (YES in the ST6), the user's finger is in contact with the enlarged image key 24 displayed. Thereby a process, indicated by key information stored in the system memory 29, corresponding to the touched image key 24 is executed (ST7). For example, if the process corresponding to the image key 24 is to input a letter "J", the letter "J" is inputted to a position of a cursor in the text input field 19. Note that if there are two or more detection cells with the voltage values each exceeding the first threshold value, it is determined that, for example, the image key closest to or over the detection cell, located at the center of the detection cells exceeding the first threshold value, is chosen in a manner similar to the display of the enlarged on-screen keyboard 21.

After the process corresponding to the image key 24 is executed, the on-screen keyboard 21 is displayed in the default size (see FIG. 1) (ST8). Note that the process of the ST8 is executed when the process corresponding the image key 24 is performed by the user's finger touch on the image key 24 or when the user's finger is moved away from the touch panel 12 by the distance greater than or equal to the distance D (or when the user's finger is not approaching the touch panel 12).

Until predetermined time, for example, one minute, elapses after the on-screen keyboard 21 has been displayed in the default size (NO in ST9), the voltage value from the detection cell is obtained (ST10) to determine whether there is any detection cell with the voltage value exceeding the second threshold value (ST11). When there is a detection cell with the voltage value exceeding the second threshold value (YES in ST11), the on-screen keyboard 21 is enlarged to the same size as that of the last enlarged display without the estimation of the contact surface size (ST12). Also in this case, the image key 24 closest to the finger is identified based on the expected contact position of the finger. The on-screen keyboard 21 is enlarged with the identified image key 24 as the center of enlargement. Note that when there is no detection cell with the voltage value exceeding the second threshold value (NO in the ST11), the on-screen keyboard 21 is not enlarged and remains in the default size (ST8).

When predetermined time, for example, one minute, elapses after the on-screen keyboard 21 has been displayed in the default size (YES in ST9), the RAM area of the system memory is cleared (ST1), and the same sequence as that described above is repeated.

Owing to the above-described display update process, the on-screen keyboard 21 is enlarged to the size corresponding to the contact surface size of the finger when the user's finger approaches the input field 20 to perform the input operation through the touch panel 12. In this state, the desired image key 24 is chosen. Thereby, the error operation such as the finger coming in contact with the image key 24 not intended to be touched is prevented. The input operation is performed reliably.

In the above embodiment, the contact surface size of the finger is obtained from the number of the detection cell(s). The on-screen keyboard is enlarged based on the contact surface size. Alternatively, the size of each finger (the index finger, the thumb, or the like) of the user may be measured in advance and stored in a memory. In this case, which finger is approaching the touch panel is identified based on a correlation between the number of the detection cells outputting voltage values greater than or equal to a predetermined value and the contact surface size of each finger. The magnification ratio for the on-screen keyboard is determined in accordance with the finger identified, and the on-screen keyboard is enlarged accordingly.

Instead of the touch panel of the projection type capacitive system, a touch panel of an optical sensor system or an infrared image sensor system may be used. The touch panel of the optical sensor system incorporates a liquid crystal driving circuit and an optical sensor circuit in each pixel of a liquid crystal display.

In the above embodiment, the on-screen keyboard is enlarged such that the size of the image key becomes 120% of the contact surface size of the finger. The enlargement is performed to allow the user to input through a key comfortably. For example, the size of the image key may be enlarged within a range of 50 to 150% of the contact surface size of the finger as necessary. It is preferable that the CPU (the magnification ratio determiner having a magnification ratio changing function) displays a menu for changing the magnification ratio on the touch panel. It is preferable that the basic magnification ratio 120% is changed within a range in the order of 0.8 to 1.2 times the basic magnification ratio 120% according to a preference of the user when the basic magnification ratio 120% is not suitable.

Instead of the user's finger, a contact pen or stylus may be used as the input medium. When the size of the image key is smaller than the contact surface size of the contact pen, the magnification ratio is determined such that the size of the image key after the enlargement becomes larger than the contact surface size of the contact pen.

As described in the above embodiment, the present invention covers a form of a program and a storage medium for storing the program.

Various changes and modifications are possible in the present invention and may be understood to be within the present invention.

What is claimed is:

1. A touch panel device comprising:
a touch panel having an input field for accepting input operation of an input medium and detection cells each detecting an approach value indicating a degree of proximity and contact with the input medium to the input field;
an input section having input elements displayed in the input field of the touch panel;
an input medium size estimator for estimating a contact surface size and an expected contact position of the input medium based on a number of the detection cells outputting a first approach value within a range between a first threshold value and a second threshold value, the second threshold value being smaller than the first threshold value;
a magnification ratio determiner for calculating a basic magnification ratio based on the contact surface size of the input medium and a size of an input element of the input elements and dynamically adjusting the basic magnification ratio at a ratio within a predetermined range to determine a current magnification ratio with respect to the input element;
a display controller for enlarging and displaying the input section at a magnification ratio with the input element, closest to the expected contact position, at a center of the expected contact position of the input medium, the display controller using same magnification ratio as a magnification ratio of last enlarged display, instead of the current magnification ratio, within a predetermined elapsed time from the last enlarged display; and
an accepting section for accepting command input corresponding to the input element closest to the detection cell outputting a second approach value when at least one of the detection cells outputs the second approach value greater than the first threshold value,
wherein after the display controller enlarges the display within the predetermined elapsed time, the magnification ratio of the last enlarged display is used without estimating the contact surface size of the input medium even in a case where the detection cells outputting the first approach value exist.

2. The touch panel device of claim 1, wherein the magnification ratio determiner determines the magnification ratio such that size of an enlarged input element becomes larger than the contact surface size when the size of the input element is smaller than the contact surface size of the input medium.

3. The touch panel device of claim 1, wherein the predetermined range is at least 120% of the size of the input element.

4. The touch panel device of claim 1, wherein the display controller enlarges and displays an entirety of the input section at the magnification ratio with the input element, closest to the expected contact position, at the center of the expected contact position of the input medium.

5. The touch panel device of claim 1, wherein the display controller enlarges and displays an entirety of the input section at the magnification ratio with the input element, closest to the expected contact position, at the center of the expected contact position of the input medium such that an input element of the input elements displayed in the input field of the touch panel.

6. A display method for a touch panel device on which input operation is performed by an input medium approaching and coming in contact with an input section composed of input elements displayed on an input field of a touch panel, the display method comprising:
detecting an approach value indicating a degree of proximity and contact with the input medium to the input field;
estimating a contact surface size and an expected contact position of the input medium based on a detection cell outputting a first approach value within a range between a first threshold value and a second threshold value, the second threshold value being smaller than the first threshold value;
calculating a basic magnification ratio of the input element based on the contact surface size of the input medium and a size of an input element of the input elements and dynamically adjusting the basic magnification ratio at a ratio within a predetermined range to determine a current magnification ratio with respect to the input element;
enlarging and displaying the input section at a magnification ratio with the input element, closest to the expected contact position, at a center of the expected contact position of the input medium, and enlarging and displaying the input section at same magnification ratio as a magnification ratio of last enlarged display, instead of the current magnification ratio, within a predetermined elapsed time from the last enlarged display; and
accepting command input corresponding to the input element closest to the detection cell outputting a second approach value when at least one of the detection cells outputs the second approach value greater than the first threshold value,
wherein after the enlarging enlarges the display within the predetermined elapsed time, the magnification ratio of the last enlarged display is used without estimating the contact surface size of the input medium even in a case where the detection cells outputting the first approach value exist.

7. The method of claim 6, wherein the predetermined range is at least 120% of the size of the input element.

8. The method of claim 6, wherein the enlarging and displaying enlarges and displays an entirety of the input section at the magnification ratio with the input element, closest to the expected contact position, at the center of the expected contact position of the input medium.

9. The method of claim 6, wherein the enlarging and displaying enlarges and displays an entirety of the input section at the magnification ratio with the input element, closest to the expected contact position, at the center of the expected contact position of the input medium such that an input element of the input elements displayed in the input field of the touch panel.

* * * * *